United States Patent [19]

Kishimoto et al.

[11] Patent Number: 5,451,381

[45] Date of Patent: *Sep. 19, 1995

[54] GAS GENERATING AGENT PACK FOR AIR BAG INFLATION GAS GENERATOR

[75] Inventors: Junichi Kishimoto; Takashi Minamizawa, both of Fukushima, Japan

[73] Assignee: Nippon Koki Co., Ltd., Tokyo, Japan

[*] Notice: The portion of the term of this patent subsequent to Sep. 22, 2011 has been disclaimed.

[21] Appl. No.: 121,309

[22] Filed: Sep. 15, 1993

[30] Foreign Application Priority Data

Jun. 22, 1993 [JP] Japan ................ 5-150391

[51] Int. Cl.⁶ ................ B01J 7/00
[52] U.S. Cl. ................ 422/305; 280/736; 280/741; 422/166
[58] Field of Search ........ 422/165, 166, 167, 305; 280/736, 741

[56] References Cited

U.S. PATENT DOCUMENTS

| | | | |
|---|---|---|---|
| 4,249,673 | 2/1981 | Katoh et al. | 102/530 |
| 4,981,655 | 1/1991 | Kolbe et al. | 102/530 |
| 5,167,426 | 12/1992 | Mihm et al. | 280/736 |
| 5,219,178 | 6/1993 | Kobari et al. | 280/736 |
| 5,253,895 | 10/1993 | Bretfeld et al. | 280/736 |
| 5,350,193 | 9/1994 | Murashima et al. | 280/736 |

FOREIGN PATENT DOCUMENTS

| | | | |
|---|---|---|---|
| 0324639 | 7/1989 | European Pat. Off. | 280/736 |
| 9222440 | 12/1992 | WIPO | 280/736 |

*Primary Examiner*—W. Gary Jones
*Assistant Examiner*—Laura E. Edwards
*Attorney, Agent, or Firm*—Kalish & Gilster

[57] ABSTRACT

In a gas generating agent pack for an air bag inflation gas generator of this invention, a plurality of gas generating agents with a through hole formed at the center is accommodated in the axial direction in the stacked state within a longitudinal cylindrical pack whose both ends are tightly closed, and an energizing means for energizing the gas generating agents toward the end of the cylindrical pack is disposed within the cylindrical pack, so that the plurality of gas generating agents accommodated into the cylindrical pack can be tightly contacted securely to one another.

11 Claims, 6 Drawing Sheets

GAS GENERATING AGENT PACK FOR AIR BAG INFLATION GAS GENERATOR

BACKGROUND OF THE INVENTION

1. Field of the Invention

This invention relates to a gas generating agent pack for an air bag inflation gas generator to be used to form a combustion chamber in the air bag inflation gas generator.

2. Description of the Prior Art

A prior shock absorber to protect a passenger car driver from shocks at collision accidents comprises an air bag and a gas generator to inflate the air bag with gas. At a collision accident of a passenger car, explosives or other gas generating agents having a similar composition thereto, which are charged in the gas generator, are ignited and burnt to produce gas. The air bag is instantaneously inflated by the resultant gas for protecting the driver against any collision shocks, thereby avoiding possible serious injury of the driver.

FIG. 7 shows the air bag inflation gas generator disclosed in Japanese Patent Application Laid-open Print No. 138005/1993.

This air bag inflation gas generator comprises a longitudinal outer cylindrical member 13 having a plurality of gas outlets 11 formed in the outer periphery, an inner cylindrical member 17 inserted in the outer cylindrical member 13 and having gas flow openings 15 formed in the outer periphery, a final filter 19 disposed between the outer cylindrical member 13 and the inner cylindrical member 17, a plurality of gas generating agents 23 with a through hole 21 formed at the center accommodated in the stacked state in the axial direction of the inner cylindrical member 17, and an igniter 25 and an ignition agent 27 disposed at one end of the inner cylindrical member 17, wherein the gas generating agents 23 and the ignition agent 27 are accommodated in a gas generating agent pack 29.

With the above air bag inflation gas generator, volume of combustion gas from the gas generating agents 23 can be steeply increased and a large volume of combustion gas can be surely purified.

But, the gas generating agent pack 29 for the above conventional air bag inflation gas generator has drawbacks that it is difficult to tightly stack the gas generating agents 23 without any gaps in the gas generating agent pack 29 and the gas generating agents 23 are mutually bumped by vibration, resulting in damages.

More specifically, the aforementioned gas generating agents 23 are generally produced by dispersing a gas generating component into a binder, charging the resultant binder into a metal mold and molding under pressure. But, it is very difficult to produce them in a uniform thickness. Therefore, when many of such gas generating agents 23 are accommodated in the gas generating agent pack 29, errors in thickness are accumulated and, for example, when about 20 gas generating agents are stacked, about 3-mm gap is formed in the gas generating agent pack 29 in the worst case and the gas generating agents 23 are mutually bumped by vibration, possibly damaging them.

SUMMARY OF THE INVENTION

This invention has remedied the above problems and aims to provide a gas generating agent pack for an air bag inflation gas generator which can tightly contact a plurality of gas generating agents accommodated in a cylindrical pack.

This invention accommodates a plurality of gas generating agents with a through hole formed at the center in the stacked state in the axial direction within a longitudinal cylindrical pack whose both ends are tightly closed and disposes an energizing means within the cylindrical pack to energize the gas generating agents toward the end of the cylindrical pack.

In this invention, the gas generating agent is energized toward the end of the cylindrical pack by the energizing means and a plurality of gas generating agents is tightly contacted by this energizing.

DESCRIPTION OF THE PREFERRED EMBODIMENT OF THE INVENTION

This invention will be described in detail with reference to the attached drawings.

Figure 1:
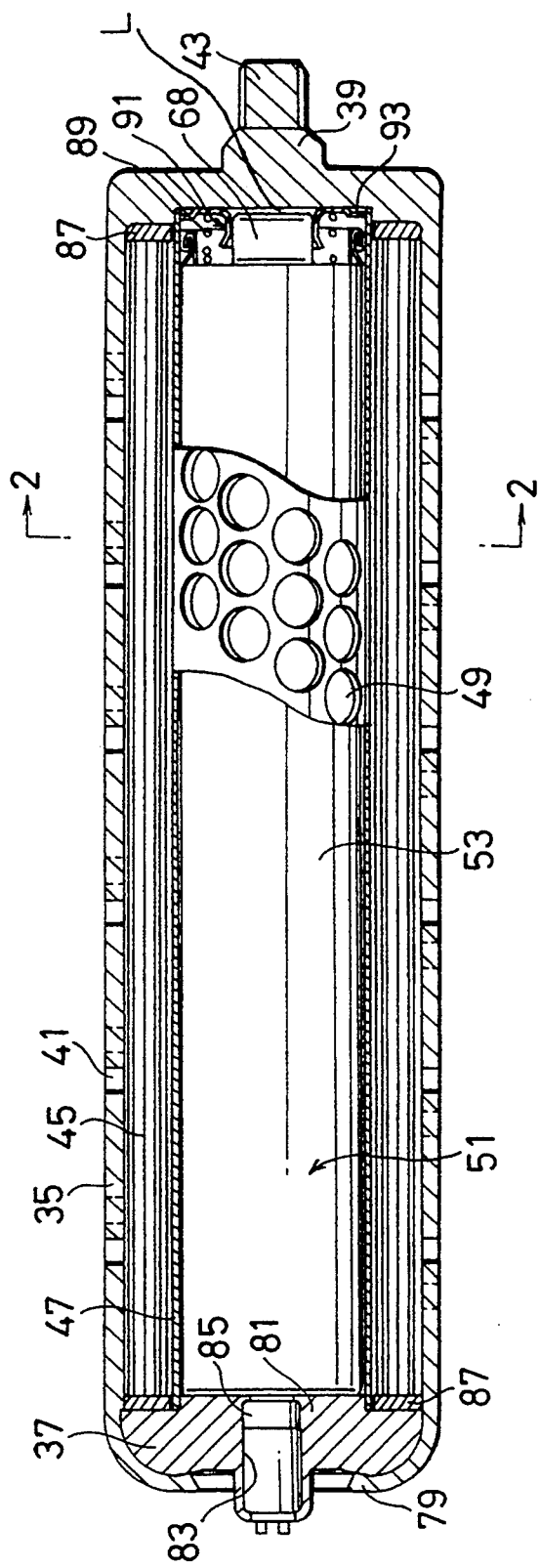
FIG. 1 is a longitudinal sectional view showing one embodiment of an air bag inflation gas generator of this invention.
Figure 2:
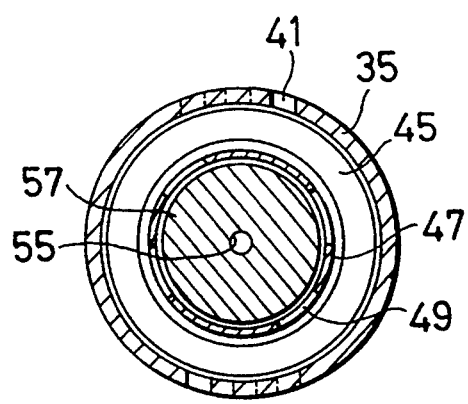
FIG. 2 is a transverse sectional view taken along the line 2—2 of FIG. 1.

FIG. 1 and FIG. 2 show an air bag inflation gas generator provided with one embodiment of a gas generating agent pack of this invention. In the drawings, the reference numeral 35 represents a longitudinal outer cylindrical member whose both ends are tightly closed by end plate parts 37, 39.

The outer cylindrical member 35 has a plurality of gas flow openings 41 formed in its outer periphery.

And, the end plate part 39 is integrally formed with a part 43 to be mounted on a vehicle.

The outer cylindrical member 35 has a cylindrical final filter 45 disposed therein.

This final filter 45 is formed by winding, for example, fine-mesh woven metal wire, close-woven metal wire, etc. in layers. This filter has the functions that the combustion gas is cooled so that the air bag is not damaged, the combustion residue contained in the combustion gas is removed, and harmless nitrogen gas only is supplied into the air bag.

Inside the final filter 45 is inserted an inner cylindrical member 47.

The inner cylindrical member 47 has many gas flow openings 49 formed in the entire length of the outer periphery thereof.

The inner cylindrical member 47 accommodates a gas generating agent pack 51 which is one embodiment of this invention.

Figure 3:
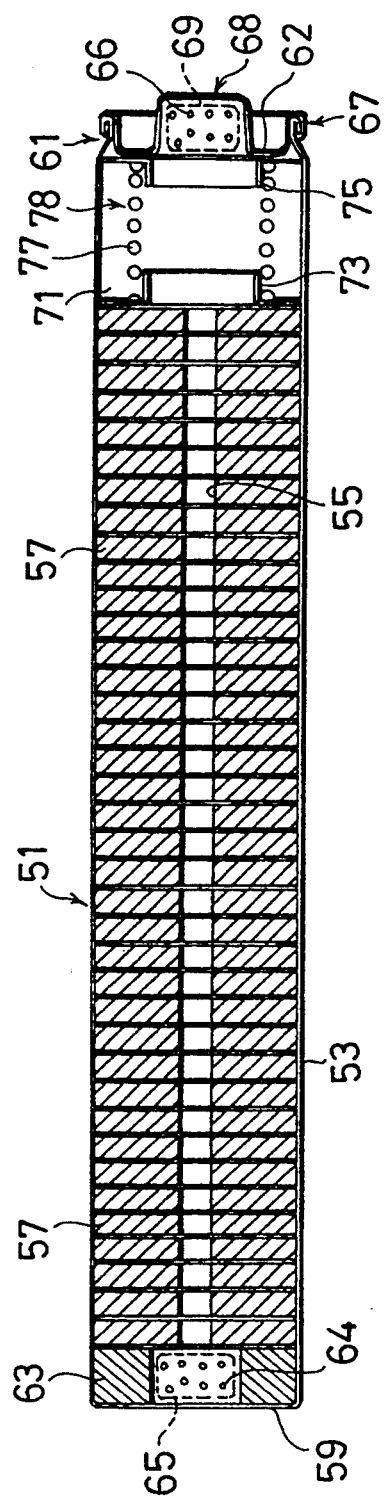
FIG. 3 is a sectional view showing the gas generating agent pack of FIG. 1.

The gas generating agent pack 51 has a bottom-closed longitudinal cylindrical pack 53 which is made of aluminum as shown in FIG. 3.

Within the cylindrical pack 53, many gas generating agents 57 having a through hole 55 formed in their center are accommodated in the stacked state in the axial direction.

One end of the cylindrical pack 53 is sealed by an end face 59, and the other end is sealed by another end face 62 made of, for example, an aluminum cap 61.

At one end of the cylindrical pack 53, a cylindrical spacer 63 is disposed.

This spacer 63 is formed of, for example, aluminum and an ignition agent 64 is disposed at its center.

The ignition agent 64 contains powder for auto-ignition which ignites at a low temperature of 180° C. and is accommodated in an ignition agent pack 65.

On the other hand, the cap 61 disposed on the other end of the cylindrical pack 53 is tightly wound around its outer periphery by the cylindrical pack 53 to have a cylindrical fasten-folded section 67.

And, at the center of the cap 61 is formed a projection 68 to accommodate an ignition agent 66.

The ignition agent 66 contains powder for auto-ignition which ignites at a low temperature of 180° C. and is accommodated in an ignition agent pack 69.

A space 71 is formed on the side of the cap 61 in the cylindrical pack 53. In the space 71, a holder 73 which is in contact with one of the gas generating agents 57 and another holder 75 which is in contact with the cap 61 are accommodated. Both ends of a coil spring 77 are supported by the holders 73, 75 to form an energizing means 78.

As shown in FIG. 1, the end plate part 37 which seals one end of the outer cylindrical member 35 is made of an end cap and caulked for fixing against the cylindrical pack 53 by an open end 79 of the outer cylindrical member 35.

The above fixing by caulking is made by a step that with a mating section 81 of the end plate part 37 mated with the open end of the inner cylindrical member 47, the open end 79 of the outer cylindrical member 35 is bent toward the end plate part 37 by a press under a certain pressure to effect plastic deformation.

A through hole 83 is formed at the center of the end plate part 37, and an igniter 85 is inserted into the through hole 83 and is fixed to the end plate part 37 by caulking.

A packing 87 made of, for example, inflammable silicone rubber, is disposed between one end of the final filter 45 and the end plate part 37 and between the other end of the final filter 45 and the end plate part 39.

In this embodiment, an energizing member 89 made of, for example, a coil spring is disposed between the cap 61 forming the end face 62 of the gas generating agent pack 51 and the end plate part 39 of the outer cylindrical member 35.

And, the leading end of the projection 68 is disposed with a certain gap L provided against the end plate part 39.

With this projection 68, a heat transmission member 91 which is pressed by the energizing member 89 against the end plate part 39 is mated by a mating load smaller than the energizing load of the energizing member 89.

Figure 4:
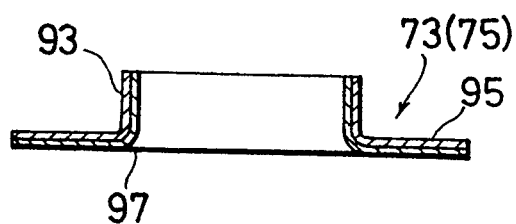
FIG. 4 is a sectional view showing the holder of FIG. 3.

FIG. 4 shows the details of a pair of holders 73, 75 which is disposed within the cylindrical pack 53 shown in FIG. 3. These holders 73, 75 are made of aluminum for example and have an annular flange 95 formed at one end of a cylinder 93.

And, a rust-preventive film 97 is adhered to the outer face of the flange and the inner face of the cylinder 93.

This rust-preventive film 97 prevents the holders 73, 75 from being corroded by azide contained in the gas generating agents 57. This film 97 is made of a nylon resin having a thickness of about 15 to 150 micrometers for example.

Figure 5:
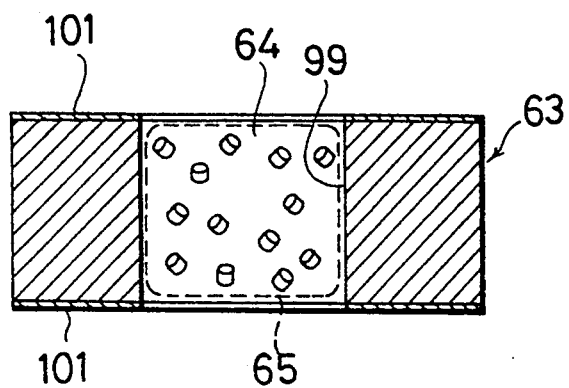
FIG. 5 is a sectional view showing the spacer of FIG. 3.

FIG. 5 shows the details of the spacer 63 which is disposed within the cylindrical pack 53 shown in FIG. 3. This spacer 63 has the shape of a relatively thick cylinder. It has the ignition agent pack containing the ignition agent 64 therein disposed in its through hole 99.

And, a sealing member 101 is adhered to both sides of the spacer 63 to shield the through hole 99.

This sealing member 101 is made of a transparent polyester resin film for example.

In the aforementioned air bag inflation gas generator, the ignition agent 64 burns when electricity is sent to the igniter 85, which in turn burns the gas generating agents 57, the cylindrical pack 53 of the gas generating agent pack 51 is broken at the gas flow openings 49 of the inner cylindrical member 47, the combustion gas flows into the final filter 45 through the gas flow openings 49 of the inner cylindrical member 47 and is purified by the final filter 45, then it is flown into the air bag through the gas outlets 41 of the outer cylindrical member 35.

And, in the above embodiment, when electricity is sent to the igniter 85 which is disposed at one end of the outer cylindrical member 35, the ignition agent 64 disposed at one end burns first and the gas generating agent 57 adjacent to the igniter 85 starts burning and, at the same time, the ignition agent 66 disposed at the other end burns, and the gas generating agent 57 next to it burns.

In the gas generating agent pack of the air bag inflation gas generator configured as described above, since the energizing means 78 which energizes the gas generating agents 57 toward the end face 59 of the cylindrical pack 53 is disposed within the cylindrical pack 53, a plurality of gas generating agents 57 accommodated into the cylindrical pack 53 can be closely contacted to one another.

More specifically, with the aforementioned gas generating agent pack, when many gas generating agents 57 are accommodated in the cylindrical pack 53, errors in thickness are accumulated and, for example, when about 40 gas generating agents 57 are stacked, accumulation of errors will reach about 6-mm in the worst case. But, since the gas generating agents 57 are surely pressed against the end face 59 of the cylindrical pack 53 by the energizing means 78, a plurality of gas generating agents 57 can be tightly contacted to one another. As a result, the gas generating agents 57 are not mutually bumped by vibration, and a possibility of damaging the gas generating agents 57 can be extensively reduced as compared with prior art.

And, since the coil spring 77 with high expansion and contraction properties is used as the energizing means 78 in this embodiment, the gas generating agents 57 can be surely energized even if the accumulation of errors of the gas generating agents 57 is increased.

Furthermore, in the above embodiment, since the holders 73, 75 are disposed at both sides of the coil spring 77 to support them, the gas generating agents 57 can be surely energized by the coil spring 77.

Besides, since the rust-preventive film 97 is adhered to the exterior of the holders 73, 75 in this embodiment, the holders 73, 75 are surely prevented from being corroded by azide contained in the gas generating agents 57.

In addition, with the above gas generating agent pack, the spacer 63 which is disposed in contact with the end face 59 of the cylindrical pack 53 is surely pressed against the end face 59 by the energizing member 78. Thus, a space can be surely retained between the igniter 85 and the ignition agent 64 and reliability of ignition by the igniter 85 can be improved.

And, with the aforementioned gas generating agent pack, since the through hole 99 of the spacer 63 in which the ignition agent 64 is accommodated is shielded by the sealing member 101, the ignition agent 64 is prevented from being moistened by means of a simple structure.

Furthermore, with the aforementioned gas generating agent pack, since the ignition agent 64 in which powder for automatic ignition which ignites at a low temperature of 180° C. for example is disposed within the spacer 63 made of aluminum having good heat conductivity, if a car catches fire, heat from the end plate part 37 on the side of the igniter 85 is effectively transmitted to the spacer 63, igniting the powder for automatic ignition. Thus, potential destruction of the air bag inflation gas generator in case of a car fire can be surely prevented.

Figure 6:
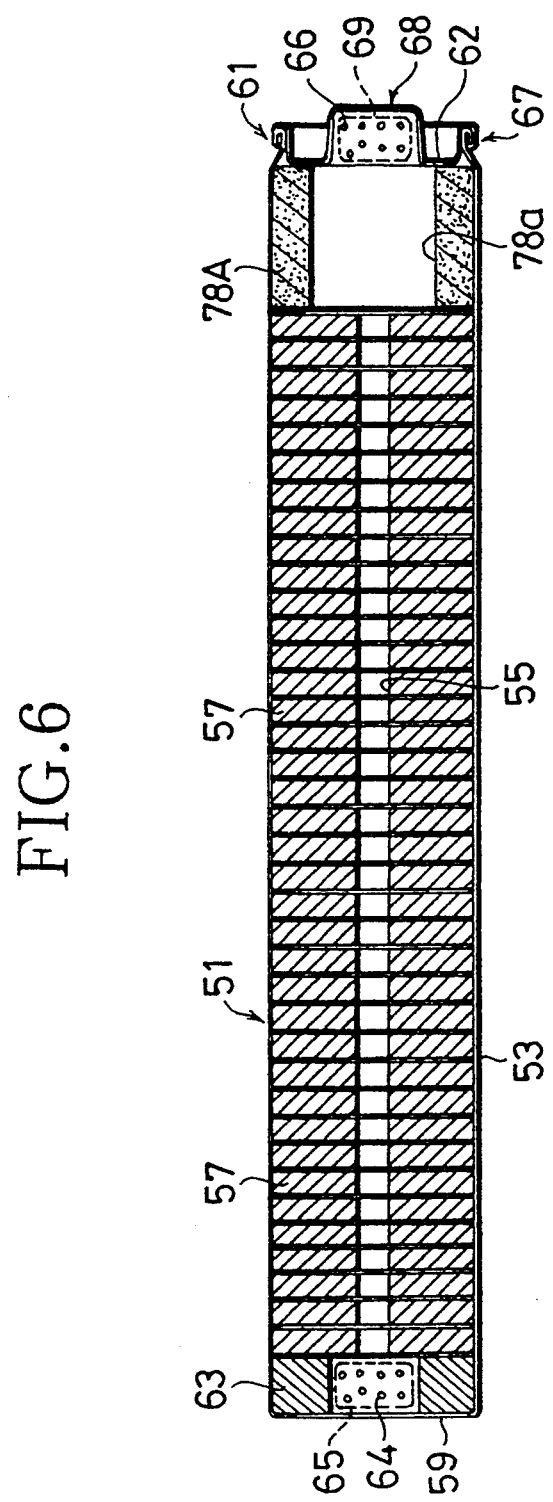
FIG. 6 is a sectional view showing another embodiment of the air bag inflation gas generator of this invention.
Figure 7:
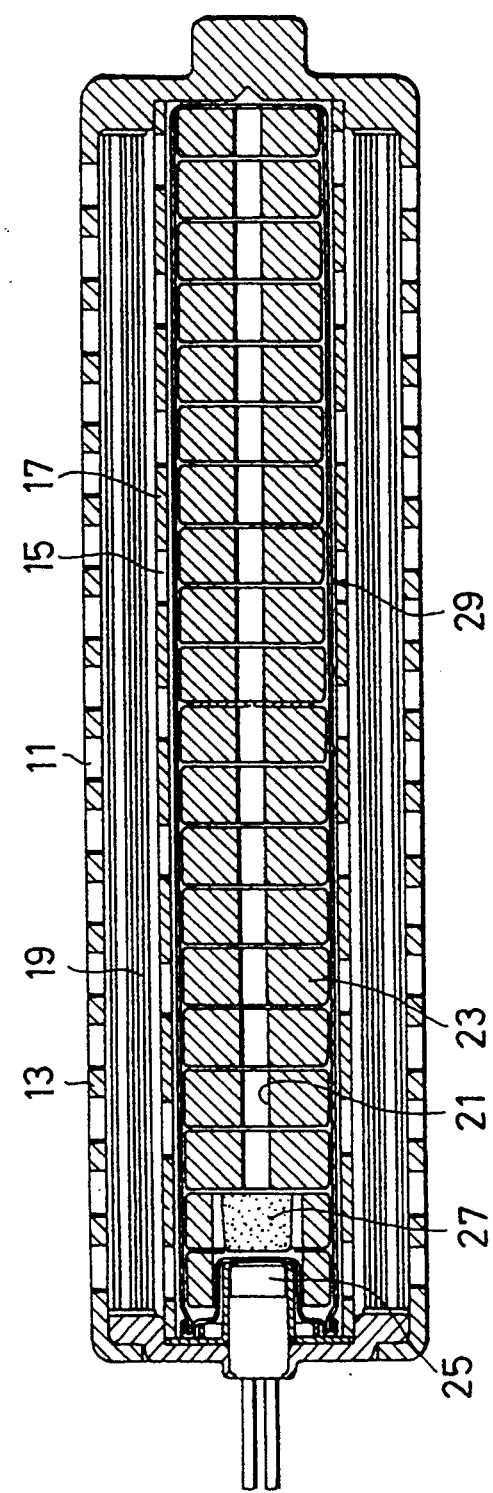
FIG. 7 is a longitudinal sectional view showing the air bag inflation gas generator disclosed in Japanese Patent Application Laid-open Print No. 138005/1993.

FIG. 6 shows another embodiment of this invention. In this embodiment, an energizing member 78A which is made of expanded silicone and has a through hole 78a in the axial direction is disposed between the cap 61 and the gas generating agent 57. This energizing member 78A energizes the gas generating agents 57 toward the end face 59.

This embodiment also provides an effect which is almost same with that obtained by the aforementioned embodiment.

In the aforementioned embodiments, the coil spring 77 or the expanded silicone is used as the energizing means 78 but this invention is not limited to the above embodiments. It is needless to say that a spring member such as leaf spring or a cushion member such as sponge can be used.

What is claimed is:

1. A gas generating agent pack for an air bag inflation gas generator including an outer portion, the agent pack comprising a housing, a plurality of gas generating agents disposed therein, said gas generating agents having a through hole formed at the center which is accommodated in the axial direction in a stacked state within a longitudinal cylindrical pack disposed within said housing, said longitudinal cylindrical pack having a first end and a second end, wherein both ends of said longitudinal cylindrical pack are tightly closed, an energizing means for energizing said gas generating agents toward at least one end of said cylindrical pack, said energizing means being disposed within said cylindrical pack, auto-ignition powder, and a cylindrical spacer disposed at the second end of said longitudinal cylindrical pack for encompassing said powder, said cylindrical spacer being disposed in contact with an end face of said longitudinal cylindrical pack by said energizing means pressing upon said gas generating agents against said cylindrical spacer, said cylindrical spacer having heat conductivity for transmitting heat from an inflator outer portion for causing auto-ignition of said powder in response to heat externally of the gas generator.

2. A gas generating agent pack for an air bag inflation gas generator according to claim 1, wherein said energizing means comprises a pair of spring holders disposed in the axial direction of the cylindrical pack at a certain interval and a coil spring disposed between said spring holders, both ends of said coil spring being supported by said spring holders.

3. A gas generating agent pack for an air bag inflation gas generator according to claim 1, wherein said energizing means has a through hole formed at the center and is made of an expanded member having elasticity.

4. A gas generating agent pack for an air bag inflation gas generator according to claim 1, wherein said cylindrical pack is made of aluminum.

5. A gas generating agent pack for an air bag inflation gas generator according to claim 1, wherein a cap having an ignition agent disposed is attached to the first end of said cylindrical pack.

6. A gas generating agent pack for an air bag inflation gas generator according to claim 1 wherein said cylindrical spacer is made of aluminum.

7. A gas generating agent pack for an air bag inflation gas generator according to claim 1 wherein both sides of said cylindrical spacer have a sealing member adhered thereto for shielding said through hole.

8. A gas generating agent pack for an air bag inflation gas generator according to claim 1 wherein said auto-ignition powder ignites at a relatively low temperature.

9. A gas generating agent pack for an air bag inflation gas generator according to claim 8 wherein said temperature is 180° C.

10. A gas generating agent pack for an air bag inflation gas generator according to claim 1 wherein said cylindrical spacer positions said auto-ignition powder proximate to but spaced from an igniter.

11. A gas generating agent pack for an air bag inflation gas generator according to claim 1 wherein said energizing means is positioned at an end of said cylindrical pack which is opposite from said cylindrical spacer.

* * * * *